United States Patent
Takahashi et al.

(10) Patent No.: US 11,904,263 B2
(45) Date of Patent: Feb. 20, 2024

(54) CONNECTION ASSEMBLY AND FILTER ASSEMBLY

(71) Applicant: ENTEGRIS, INC., Billerica, MA (US)

(72) Inventors: Junya Takahashi, Yoshikawa (JP); Cheng-Tai Wang, Tokyo (JP)

(73) Assignee: ENTEGRIS, INC., Billerica, MA (US)

( * ) Notice: Subject to any disclaimer, the term of this patent is extended or adjusted under 35 U.S.C. 154(b) by 88 days.

(21) Appl. No.: 17/370,855

(22) Filed: Jul. 8, 2021

(65) Prior Publication Data

US 2022/0008848 A1 Jan. 13, 2022

Related U.S. Application Data

(60) Provisional application No. 63/050,356, filed on Jul. 10, 2020.

(51) Int. Cl.
*B01D 35/30* (2006.01)
*B01D 27/08* (2006.01)

(52) U.S. Cl.
CPC ........ *B01D 35/306* (2013.01); *B01D 27/08* (2013.01); *B01D 2201/302* (2013.01); *B01D 2201/304* (2013.01); *B01D 2201/4023* (2013.01)

(58) Field of Classification Search
CPC ............ B01D 35/306; B01D 27/08; B01D 2201/302; B01D 2201/304; B01D 2201/4023; F16L 41/08
USPC ............ 210/232, 440–444, 455, 450, 493.2
See application file for complete search history.

(56) References Cited

U.S. PATENT DOCUMENTS

| 3,229,817 | A  | * | 1/1966  | Pall ............... B01D 17/085 |
|           |    |   |         |                     210/DIG. 5 |
| 7,604,738 | B2 |   | 10/2009 | Evanovich |
| 9,630,127 | B2 |   | 4/2017  | Hoots |
| 9,713,782 | B2 |   | 7/2017  | Lam |
| 2009/0289003 | A1 | | 11/2009 | Tsai |
| 2018/0001241 | A1 | | 1/2018  | Zhibin |
| 2019/0291032 | A1 | | 9/2019  | Baird |
| 2020/0179951 | A1 | | 6/2020  | Adey |

FOREIGN PATENT DOCUMENTS

| CN | 102797925 A | 11/2012 |
| CN | 202538450 U | 11/2012 |
| CN | 108883348 A | 11/2018 |
| CN | 215721578 U | 2/2022 |
| JP | 2002179695 A | 6/2002 |
| JP | 4125051     | 4/2005 |
| JP | 2006037866 A | 2/2006 |
| JP | 4234938 B2  | 3/2009 |

* cited by examiner

*Primary Examiner* — Madeline Gonzalez

(57) ABSTRACT

A connection assembly includes a manifold configured to attach a removable cartridge and a connector pipe with a flange. The flange is disposed between an upper plate and a lower plate of the manifold and has a width that prevents tilting of the connector pipe at greater than a maximum tilt angle. The connector pipe is configured to be inserted into a port of the removable cartridge in which an O-ring is compressed between the connector and the port. A filter assembly includes a manifold, a filter removably attached to the manifold, a connector pipe with a flange disposed between an upper plate and a lower plate of the manifold, and an O-ring. The O-ring is compressed between the connector pipe and the port.

14 Claims, 8 Drawing Sheets

CONNECTION ASSEMBLY AND FILTER ASSEMBLY

CROSS-REFERENCE TO RELATED APPLICATIONS

This application claims the benefit under 35 USC 119 of U.S. Provisional Patent Application No. 63/050,356, filed Jul. 10, 2020, the disclosure of which is hereby incorporated herein by reference in its entirety.

FIELD

This disclosure is directed to connector assemblies for removable cartridges. More particularly, this disclosure is directed to filter assemblies that includes a connector manifold for attaching a filter.

BACKGROUND

A connector manifold can be used to securely connect a removable cartridge. Removable cartridges can be used for, for example, filtration, tool cleaning, chemical replacement, etc. In some instances, removable cartridges may be configured for treating a fluid. The removable cartridge can be, for example, a filter used to remove contaminants from a fluid. For example, filters can be employed in semiconductor systems to remove containments from deionized (DI) water, organic solvents, photoresist chemicals, photochemical solvents, etc. Filters can be easily removable to allow for the servicing or replacement of a filter. For example, the efficiency of many filters decreases over time and are configured to be serviced or replaced after a specific amount of time, use, etc.

SUMMARY

In an embodiment, a connection assembly is for a removable cartridge. The connection assembly includes a manifold and a connector pipe. The manifold includes an upper plate and a lower plate. The connector pipe extends through the lower plate and the upper plate. The connector pipe includes a flange disposed between the upper plate and the lower plate. The manifold is configured to attach the removable cartridge such that the connector pipe is inserted into a port of the removable cartridge. An O-ring is compressed between the connector pipe and the port. The flange has a width configured to prevent tilting of the connector pipe at greater than a maximum tilt angle. The maximum tilt angle is based on at least one of a compression ratio upper limit and a compression ratio lower limit of the O-ring.

In an embodiment, the removable cartridge is a filter.

In an embodiment, the connector pipe when angled at the maximum tilt at least one of compresses the O-ring at the compression ratio upper limit and/or compresses the O-ring at the compression ratio lower limit.

In an embodiment, a gap is provided between the flange of the connector pipe and at least one of the lower plate and the upper plate of the manifold.

In an embodiment, the flange is configured to satisfy the following relationship:

$$\frac{L \cdot h}{(C_U - C) \cdot T_O} \leq W \geq \frac{L \cdot h}{(C - C_L) \cdot T_O}$$

W is the width of the flange of the connector pipe. C is a compression ratio of the O-ring. $C_L$ is the compression ratio lower limit of the O-ring. $C_U$ is the compression ratio upper limit of the O-ring. $T_O$ is a thickness of the O-ring when it is not being compressed. L is a length between the flange and the O-ring, and h is a height of a gap provided between the flange and at least one of the upper plate and the lower plate of the manifold.

In an embodiment, the compression ratio of the O-ring is the compression ratio of the O-ring when connector pipe is inserted into the port and is aligned with the port.

In an embodiment, the compression ratio upper limit and the compression ratio lower limit of the O-ring are predetermined values based on the O-ring.

In an embodiment, the connector pipe is configured to be inserted and fluidly attached to the port with the single O-ring.

In an embodiment, the connection assembly also includes a second connector pipe. The second connector pipe extends through the lower plate and the upper plate. The second connector pipe includes a flange that is disposed between the upper plate and the lower plate. The manifold is configured to attach the removable cartridge such that the second connector pipe is inserted into a second port of the removable cartridge. A second O-ring is compressed between the second connector pipe and the second port.

The flange of the second connector pipe has a width configured to prevent tilting of the second connector pipe at greater than a maximum tilt angle. The maximum tilt angle is based on at least one of a compression ratio upper limit and a compression ratio lower limit of the second O-ring.

In an embodiment, a filter assembly includes a manifold, a filter removably attached to the manifold, a connector pipe, and an O-ring. The manifold includes an upper plate and a lower plate. The connector pipe extends through the lower plate and the upper plate of the manifold and has a flange disposed between the upper plate and the lower plate. The filter includes a port. The connector pipe is inserted into the port and the O-ring is compressed between the connector pipe and the port. The flange has a width configured to prevent the connector pipe from being tilted at greater than a maximum tilt angle. The maximum tilt angle is based on at least one of a compression ratio upper limit and a compression ratio lower limit of the O-ring.

DRAWINGS

Like numbers represent like features throughout.

DETAILED DESCRIPTION

Figure 1:
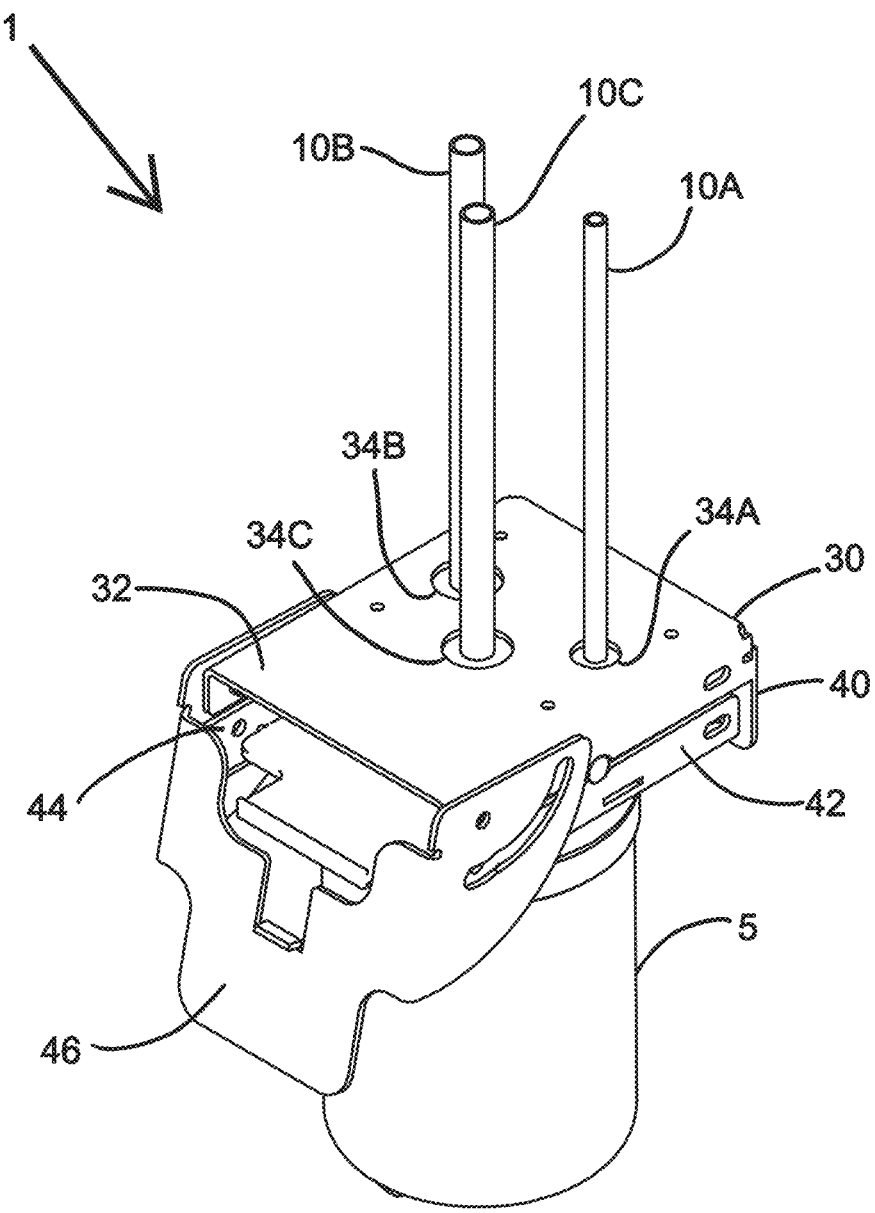
FIG. 1 is a perspective view of an embodiment of a connection assembly with an attached filter.

FIG. 1 is a perspective view of an embodiment of a connection assembly 1. A filter 5 is attached to the connection assembly 1. The filter 5 is an example of a type of removable cartridge. Removable cartridges can be used for filtration, tool cleaning, chemical replacement, etc. Incoming fluid is passed through the housing/container of the removable cartridge. In some embodiments, a removable cartridge can treat a fluid by passing the fluid through the housing/container of the removable cartridge. It would be appreciated that the filter 5 may be a different type of removable cartridge in other embodiments. In other embodiments, the connection assembly 1 may be used for attaching other types of removable cartridges such as, for example, a flushing container such as that shown in FIG. 7 and described below.

The connection assembly 1 includes connector pipes 10A, 10B, 10C, and a manifold 30. When a filter 5 is attached to the connection assembly 1 (as shown in FIG. 1), each of the connector pipes connector pipes 10A, 10B, 10C is fluidly connected to the filter 5 in a sealed manner. The connection assembly 1 with an attached filter 5 may form a filter assembly. The connection between the connector pipes 10A, 10B, 10C and the filter 5 is discussed in more detail below.

A first connector pipe 10A can be a vent connector pipe for venting the filter 5. A second connector pipe 10B can be an inlet connector pipe configured to supply unfiltered fluid to the filter 5. The third connector pipe 10C can be an outlet connector pipe for the returning filtered fluid from the filter 5 (e.g., the fluid after being filtered by the filter 5). The illustrated connection assembly 1 includes three connector pipes 10A, 10B, 10C. It should be appreciated that the connection assembly 1 in other embodiments may include a different number of connector pipes 10A, 10B, 10C. In an embodiment, a filter 5 may not utilize a vent (e.g., not have vent port). In such an embodiment, the connection assembly 1 may include only inlet connector pipe 10B and outlet connector pipe 10C.

Each of the connector pipes 10A, 10B, 10C extends through the upper plate 32 of the manifold 30. The first connector pipe 10A extends through a first opening 34A in the upper plate 32. The manifold 30 includes an upper plate 32 with a plurality of openings 34A, 34B, 34C. The second connector pipe 10B extends through a second opening 34B in the upper plate 32. The third connector pipe 10C extends through a third opening 34C in the upper plate 32.

As shown in FIG. 1, the manifold 30 also includes a back plate 40, supports 42, 44, and a lever 46 for securing the filter 5 to the manifold 30. The filter 5 is supported by two supports 42, 44. For example, the supports 42, 44 can include rails (not shown in FIG. 1) that are configured to slide into grooves (not shown in FIG. 1) in the sides of the filter 5. When the lever 46 is moved downward (e.g., into the downward position shown FIG. 1), the filter 5 is secured to the manifold 30. The downward positioned lever 46 and the back plate 40 limit the forward and rearward movement of the filter 5, respectively, which prevents the filter 5 from being disengaged from the supports 42, 44. When the lever 46 is pivoted upwards, the supports 42, 44 are moved away from the upper plate 32 (e.g., vertically downward) and the filter 5 can be removed by being slid forward. The upward positioned lever 46 no longer blocks the filter 5 from moving forward.

Figure 2:
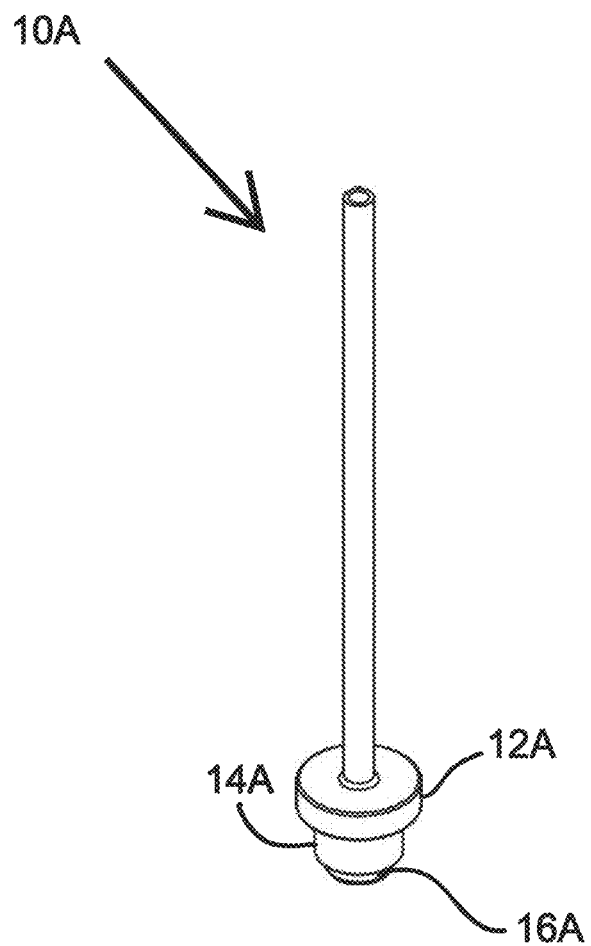
FIG. 2 is a front perspective view of a connector pipe for a connection assembly, according to an embodiment.

FIG. 2 shows a front perspective view of the first connector pipe 10A. The connector pipe 10A includes a flange 12A and an insertion end 14A. The insertion end 14A is configured to be inserted into the filter 5. The insertion end 14A of the first connector pipe 10A includes a shoulder 16A. The insertion end 14A is discussed in more detail below. In an embodiment, the second and third connector pipes 10B, 10C may each have configurations similar to the first connector pipe 10A (e.g., include a flange, insertion end, etc.).

Figure 3:
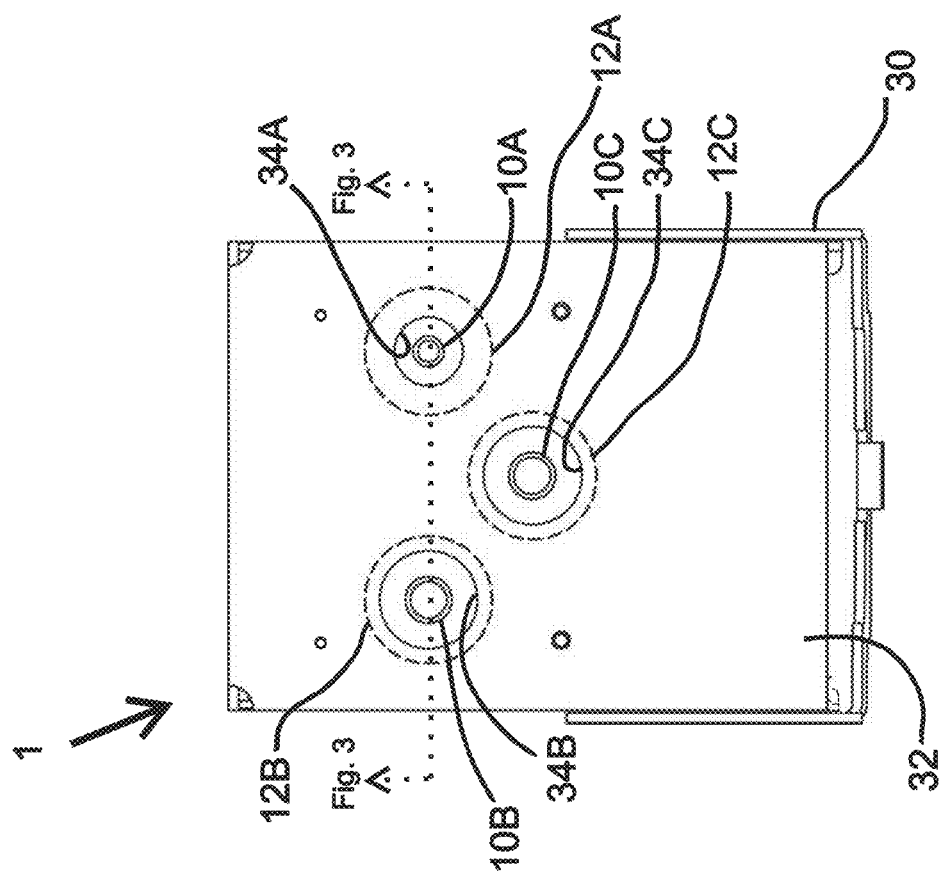
FIG. 3 is a top view of the connection assembly in FIG. 1, according to an embodiment.

FIG. 3 shows a top view of the connection assembly 1. The second connector pipe 10B and the third connector pipe 10C each respectively include a flange 12B, 12C. The flanges 12A, 12B, 12C of the connector pipes 10A, 10B, 10C are each partially obscured in FIG. 3. Dashed lines are provided in FIG. 3 to indicate outside surfaces of the flanges 12A, 12B, 12C. As shown in FIG. 3, the flanges 12A, 12B, 12C have a circular shape. The flanges 12A, 12B, 12C may have different shape(s) in other embodiments. For example, the flange 12A in an embodiment may have an oval shape, a rectangular shape, etc. The plurality of openings 34A, 34B, and 34C in the upper plate 32 are visible in the top view of FIG. 3.

Figure 4:
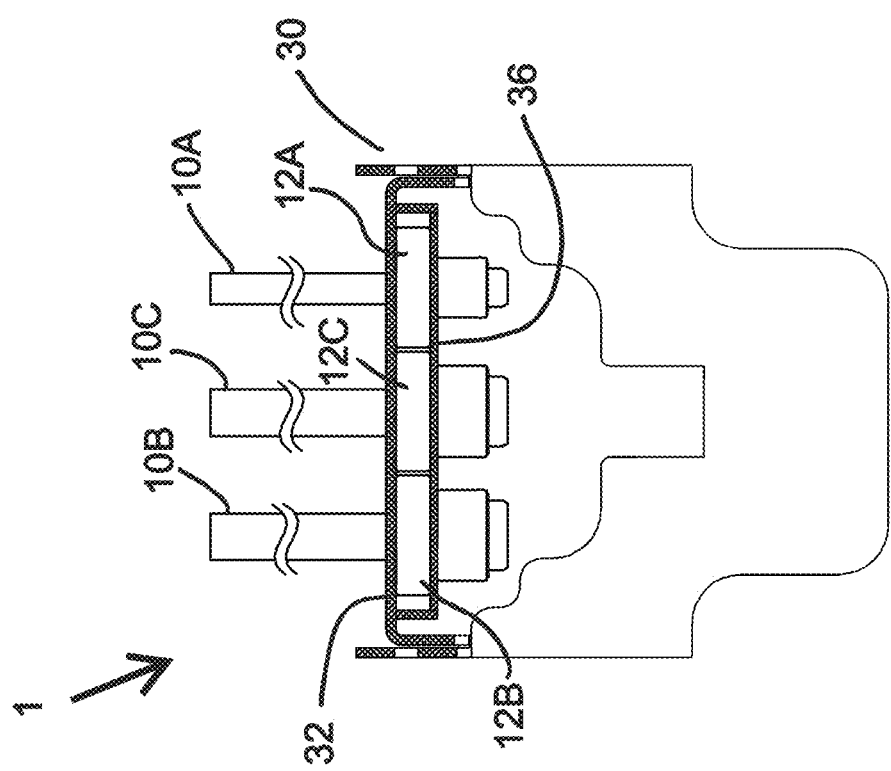
FIG. 4 is a font view of the connection assembly in FIG. 1, according to an embodiment.

FIG. 4 is a front view of the connection assembly 1 without a filter 5. The manifold 30 also includes a lower plate 36. The lower plate 36 is disposed between the filter 5 and the upper plate 32. The lower plate 36 is attached to the upper plate 32 in a fixed position. The connector pipes 10A, 10B, 10C each extend through the upper plate 32 and the lower plate 36. The respective flanges 12A, 12B, and 12C of each of the connector pipes 10A, 10B, and 10C are located between the upper plate 32 and the lower plate 36. Its flange 12A, 12B, 12C being between the upper plate 32 and the lower plate 36 limits the vertical movement of each connector pipe 10A, 10B, 10C.

Figure 5:
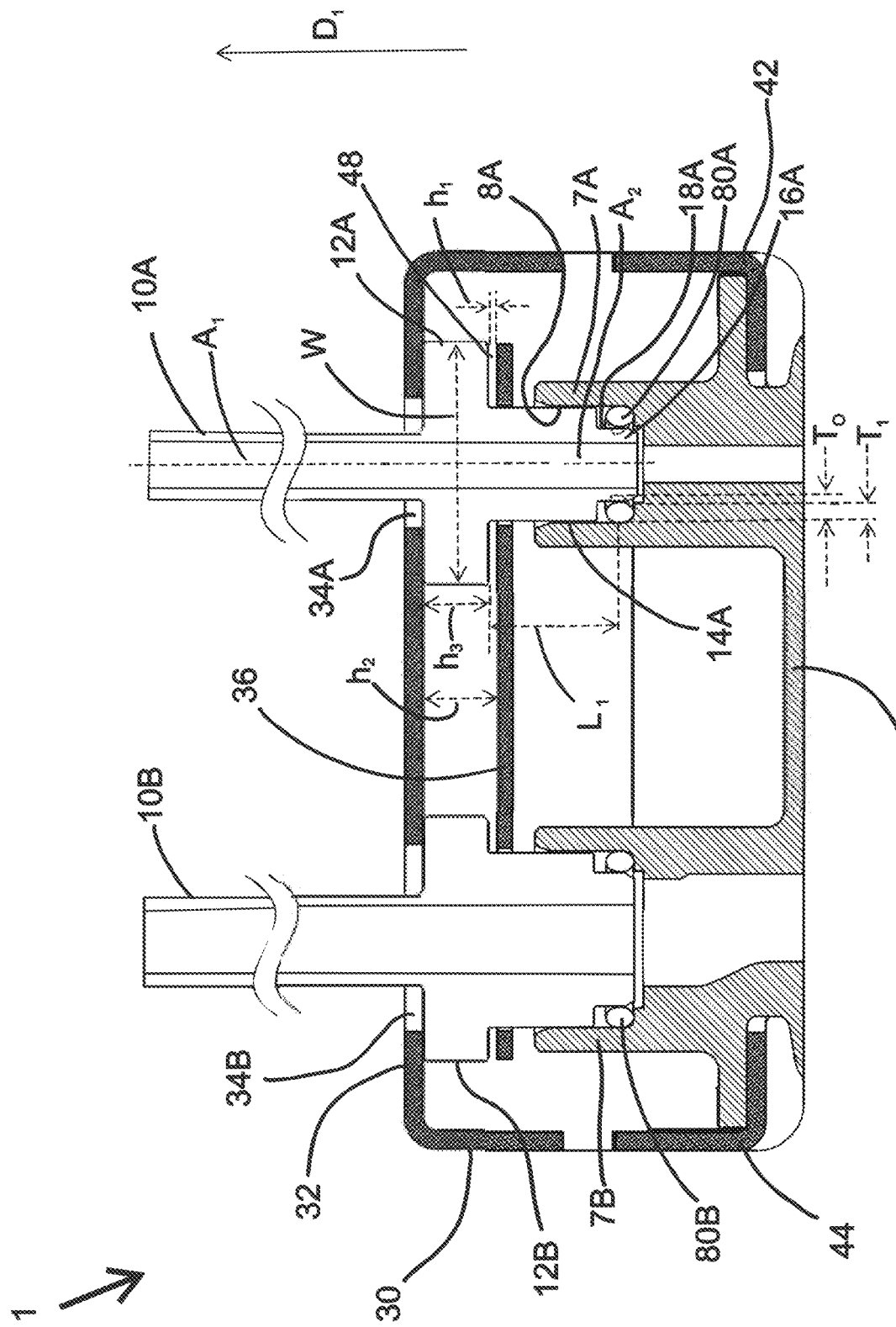
FIG. 5 shows a cross sectional view of the connection assembly as indicated by FIG. 3, according to an embodiment.

FIG. 5 is a partial cross-sectional view of the connection assembly 1 and the filter 5. The cross-section is along the plane indicated in FIG. 3. The filter 5 includes ports 7A and 7B. Connector pipes 10A and 10B are provided for the ports 7A and 7B, respectively, of the filter 5. The first port 7A can be a vent port of the filter 5 for venting the filter. The second port 7B can be an outlet port of the filter. In an embodiment, the filter 5 also includes a third port (not shown) for the third connector pipe 7C supplying unfiltered fluid into the filter. Unfiltered fluid is supplied to the first port 7A and filtered fluid is discharged from the second port 7B.

The flanges 12A, 12B of the first and second connector pipes 10A, 10B are each positioned in between the upper plate 32 and the lower plate 36. Each flange 12A, 12B is too large to pass through the openings in the upper plate 32 and the lower plate 36 for its respective connector pipe 10A, 10B. The upper plate 32 and the lower plate 36 limit the vertical movement of the connector pipes 10A, 10B.

FIG. 5 shows the filter 5 when secured to the manifold 30. The securing of the filter 5 to the manifold 30 includes the filter 5 being moved upward towards the upper plate 32 and the lower plate 36 (e.g., by pivoting the handle 46 of the manifold 30). This upward movement of the filter 5 inserts the connector pipes 10A, 10B, 10C into their respective ports 7A, 7B (one not shown) of the filter 5. The first connector pipe 10A is fluidly connected to the first port 7A and the second connector pipe 10B is fluidly connected to the second port 7B. For example, unfiltered fluid is filtered by being supplied from the second connector pipe 10B into the filter 5 via the second port 7B, being filtered as it passes through the filter 5, and being discharged from the filter 5 into the third connector pipe 10C via the third port 7C.

The first connector pipe 10A is inserted into the first port 7A. In particular, the insertion end 14A of the first connector pipe 10A is inserted into the first port 7A. An O-ring 80A is disposed in the first port 7A. The O-ring 80A may be configured to be retained with the filter 5 (e.g., by the first port 7A) or configured to be retained on the insertion end 14A of the first connector pipe 10A. The O-ring 80A forms a seal between the first connector pipe 10A and the first port 7A. In an embodiment, the first connector pipe 10A and the first port 7A are connected using only a single O-ring 80A.

The O-ring 80A is compressed between an inner wall 8A of the first port 7A and the first connector pipe 10A. For example, the O-ring 80A is compressed between the inner wall 8A of the first port 7A and an outer wall 18A of the first connector pipe 10A. The O-ring 80A can be disposed around the shoulder 16A of the first connector pipe 10A. The O-ring 80A is made of an elastic polymer material. The elastic polymer material can include, for example, a fluoroelastic or fluorocarbon polymer such as FKM polymer, ethylene propylene diene monomer (EPDM), fluororesin, fluoroelastomer, and/or other suitable elastic polymer materials (e.g., elastic materials with higher chemical resistivity).

The O-ring 80A has a thickness $T_1$. Compression of an O-ring reduces its thickness. The thickness $T_1$ may also be referred to as the compressed thickness $T_1$ of the O-ring 80A. A dashed outline is provided in FIG. 5 to illustrate the uncompressed thickness $T_O$ of the O-ring 80A (e.g., the thickness of the O-ring 80A when the first connector pipe 10A is not inserted into the first port 7A, the thickness of the O-ring 80A when not being compressed). A compression ratio of an O-ring is the percentage of a ratio of the compressed thickness to the uncompressed thickness of the O-ring. The compression ratio of the O-ring 80A can be determined as follows:

$$\text{Compression Ratio} = \left(1 - \frac{T_1}{T_O}\right) \times 100\%$$

An O-ring may no longer provide adequate sealing when over compressed or under compressed. In an embodiment, the O-ring 80A has a compression ratio upper limit and a compression ratio lower limit. The compression ratio upper limit and a ratio compression lower limit are predetermined values based on the O-ring. For example, the compression ratio upper limit to the compression ratio lower limit defines a range at which the O-ring provides stable sealing. The sealing provided by an O-ring can become unstable (e.g., allow leakage under certain operating conditions) when compressed above its compression ratio upper limit and/or when compressed below its compression ratio lower limit. The compression ratio upper limit and lower limit for an O-ring may vary based on, for example, one or more of the material that the O-ring is made of, the dimensions of the O-ring, its operation conditions, etc.

The compression ratio upper limit and lower limit of an O-ring can be predetermined values based on previous testing of the O-ring. For example, the compression ratio upper limit and the compression ratio lower limit may be values provided by the manufacturer of the O-ring. For example, the compression ratio upper limit and the compression ratio lower limit may be determined accordingly an industry standard such as, for example, according to International Standard ISO-3601-2 (e.g., ISO-3601-2:2016) for a hydraulic dynamic system. For example, according to International Standard ISO-3601-2, an O-ring with a diameter of 2.6 mm has a lower compression ratio limit of at or about 12% and an upper compression ratio limit of at or about 24%.

As shown in FIG. 5, each of the pipe connectors 10A and 10B are configured to be aligned with their respective ports 7A and 7B. For example, first pipe connector 10A is configured to connect with the first port 7A such that an axis $A_1$ of the first pipe connector 10A extends parallel to an axis $A_2$ of the first port 7A. A side force can cause one or more of the pipe connectors 10A, 10B, 10C to become tilted (e.g., relative to their respective port 7A, 7B, etc.). The third pipe connector 10C (e.g., see FIGS. 3 and 4) is similarly configured to be aligned with its respective port (not shown) of the filter 5.

Figure 6:
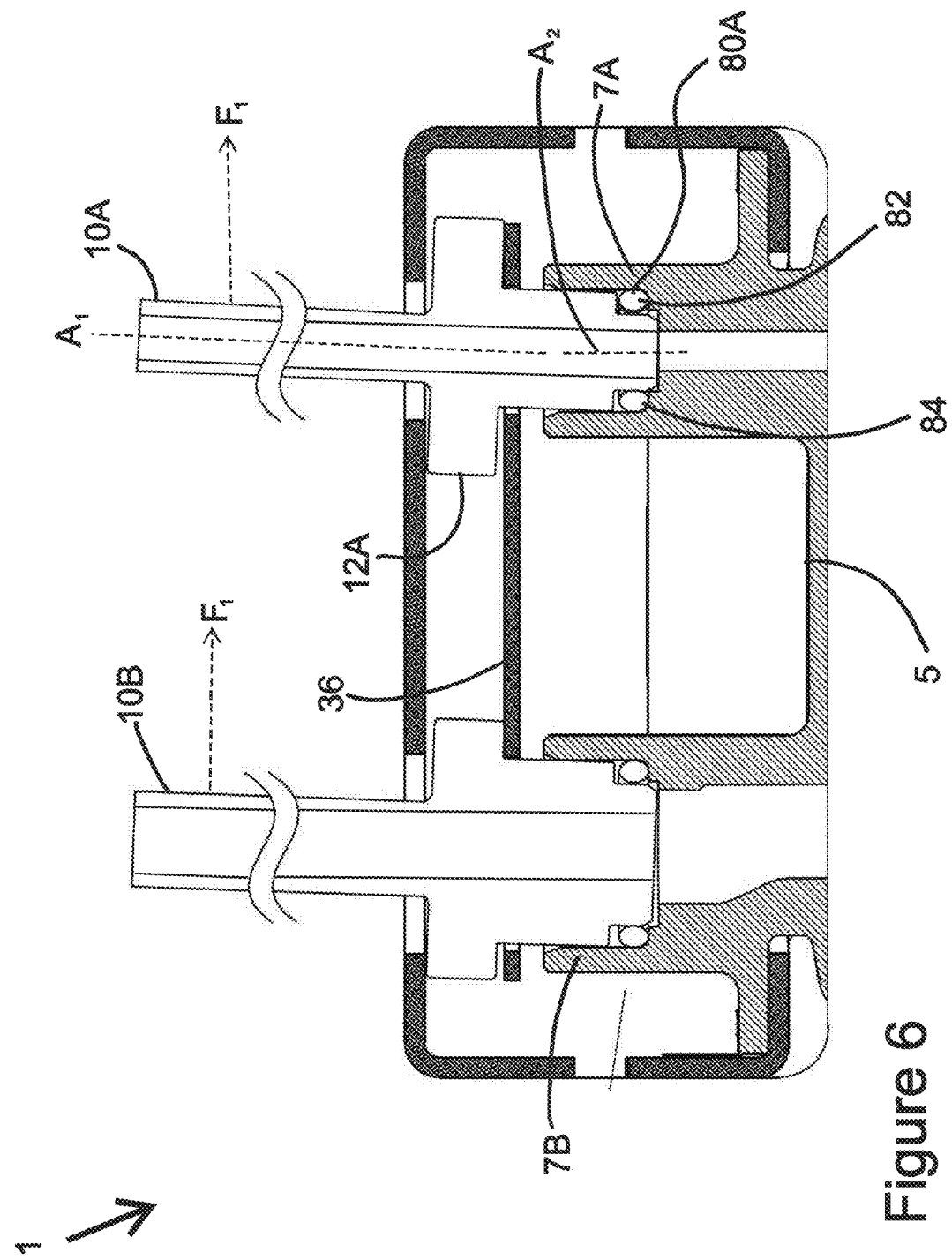
FIG. 6 shows a cross sectional view of the connection assembly in FIG. 5 after a side force is applied, according to an embodiment.

FIG. 6 shows the pipe connectors 10A, 10B when tilted by a side force $F_1$. The side force $F_1$ may be caused through an external force being applied to the filter 5, the connection assembly 30, and/or component(s) connected to one of the pipe connectors 10A, 10B, 10C (e.g., downstream piping, tubing, etc.).

The tilting of the pipe connectors 10A, 10B, 10C can change the compression of their respective O-rings 80A, 80B. Tilting of the first pipe connector 10A can increases the force applied to a first portion 82 of the O-ring 80A connector 10A and decreases the force applied to a second first portion 84 of the O-ring 80A by the first pipe connector 10A. The tilting increases the compression of the first portion 82 of the O-ring 80A and decreases the compression of the second portion 84 of the O-ring 80A. The first portion 82 and the second portion 84 are on opposite sides of the O-ring 80A.

As shown in FIG. 6, the interference between the flange 12A of the first pipe connector 10A and the manifold 30 limits the amount that the first pipe connector 10A can be tilted. The flange 12A is configured to limit the maximum amount of tilting of the first pipe connector 10A. The flange 12A limits the tilting of the first pipe connector 10A to an angle that is at or below a maximum tilt angle (e.g., prevents axis $A_1$ of the first pipe connector 10A from being tilted by more than the maximum tilt angle. The maximum tilt angle can be based on the compression ratio upper limit and the compression ratio lower limit of the O-ring 80A.

The first pipe connector 10A at the maximum tilt angle causes the O-ring 80A to be compressed to at least one of its compression ratio upper limit and/or its compression ratio lower limit. For example, the first pipe connector 10A at the maximum tilt angle compresses the first portion 82 of the O-ring 80A above its compression ratio upper limit of the O-ring 80A and/or compresses the second portion 84 below its compression ratio lower limit.

A gap 48 is provided between the flange 12A and at least one of the upper plate 32 and/or the lower plate 36. In FIG. 5, the gap 48 is provided between the flange 12A and the lower plate 36. In other embodiments, the gap 48 may be provided between the flange 12A and the upper plate 32, or the gap 48 may include an upper portion between the flange 12A and upper plate 32 and a lower portion located between the flange 12A and the lower plate 36. The gap 48 has a height $h_1$. For example, height is measured along the vertical direction $D_1$. In an embodiment, the height $h_1$ of the gap is the difference between a height $h_2$ of the space between the upper plate 32 and the lower plate 36 and a height $h_3$ of the flange 12A.

The flange 12A has a width W. As discussed above, the flange 12A can have a circular shape. In such an embodiment, the width W can be the diameter of the flange 12A. In other embodiments, the flange 12A can have a different shape then circular. In such embodiments, width W may correspond to the shortest width of said flange. The flange 12A has a length that satisfies the following relationship:

$$\frac{L \cdot h}{(C_U - C) \cdot T_O} \leq W \geq \frac{L \cdot h}{(C - C_L) \cdot T_O}$$

C is the compression ratio of the O-ring 80A. $C_L$ is the compression ratio lower limit for the O-ring 80A. $C_U$ is the compression ratio upper limit of the O-ring 80A. $T_O$ is the thickness of the O-ring 80A when not being compressed. h is the height $h_1$ of the gap 49 between the flange 12A and the manifold 30. L is a distance of the length $L_1$ of the first pipe connector 10A from the flange 12A to the O-ring 80A. The length $L_1$ can extend from the bottom of the flange 12A to the middle of the O-ring 80A. In an embodiment, the length $L_1$ may be the length $L_1$ from the bottom of the flange 12A to a position along the shoulder 16A at which the O-ring is configured to rest.

The width W of the flange 12A being equal to or greater than the left portion of above relationship prevents tilting that can cause compression of the O-ring 80A above its compression ratio upper limit, and the width W of the flange 12A being equal to or greater than the right portion of the relationship prevents tilting that can cause the O-ring 80A to be compressed below its compression ratio lower limit. The flange 12A is configured to satisfy the relationship and advantageously ensures that the seal is maintained between the inserted connector pipe 10A and its port 7A.

A width W of the flange 12A may have a maximum size based on the size of the space available between the upper plate 32 and the lower plate 36 of the manifold 30. As shown in FIG. 3, the connector pipes 10A, 10B, 10C may be located near each other along the horizontal plane. A maximum width of the first connector pipe 10A can be a distance from the first connector pipe 10A to the closest other connector pipe (e.g., the distance from the first connector pipe 10A to third connector pipe 10C).

For simplicity, the connection of the first connector pipe 10A with its respective first port 7A is described above. It should be appreciated that the other connector pipes 10B, 10C can each independently have a similar configuration and connection with their respective port 7B (a third port not shown). For example, a second O-ring 80B can be disposed in the second port 7B similar to the first O-ring 80A, and the second pipe connector pipe 10B can be configured to independently satisfy the relationship above.

Figure 7:
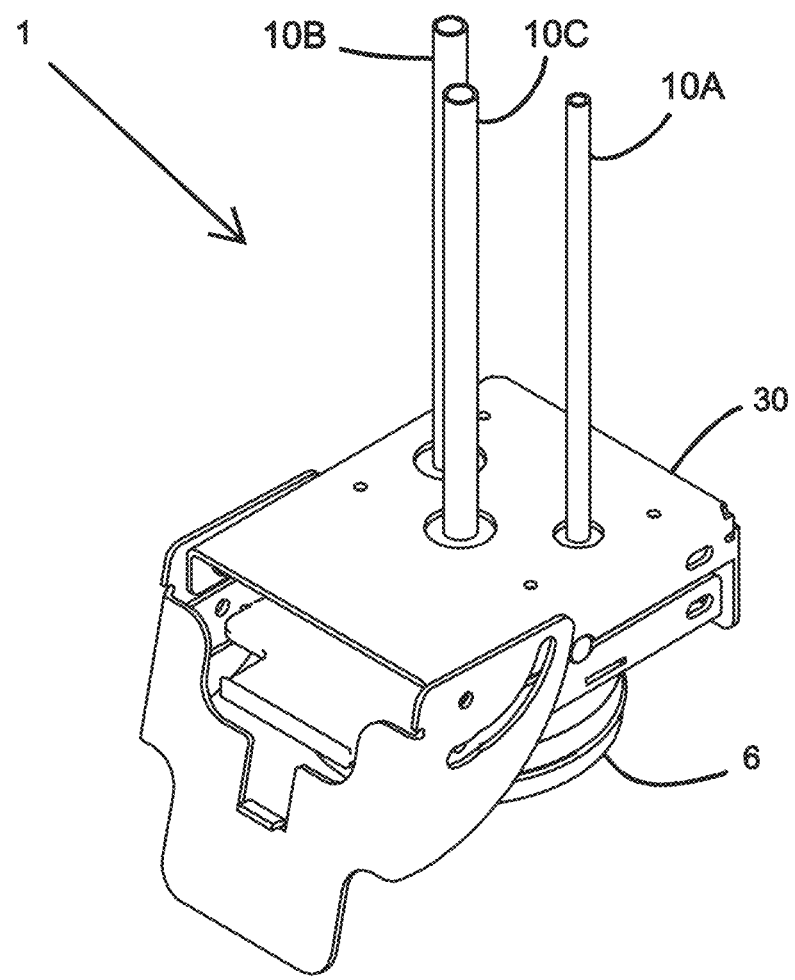
FIG. 7 is a perspective view of an embodiment of a connection assembly with an attached flushing container.

FIG. 7 is a perspective view of the connection assembly 1 with an attached flushing container 6, according to an embodiment. The flushing container 6 is attached to the manifold 30 of the connection assembly 1 in a similar manner as described above for the filter 5. For example, the connector pipes 10A, 10B, 10C are fluidly connected in a sealed manner to respective ports (not shown) of the attached flushing container 6, as similarly above described for the filter 5. The flushing container 6 is another example of a removable cartridge. The flushing container 6 can operate as a flow-through between the connector pipes 10A, 10B, 10C to allow for flushing of the connector pipes 10A, 10B, 10C and/or their attached system. For example, fluid is supplied from the second connector pipe 10B into the flushing container 6 and passes through the flushing container 6 and exits through one or both of the other connector pipes 10A, 10C. The fluid can flow through the flushing shell 6 without being treated (e.g., filtered, reacted, etc.).

Figure 8:
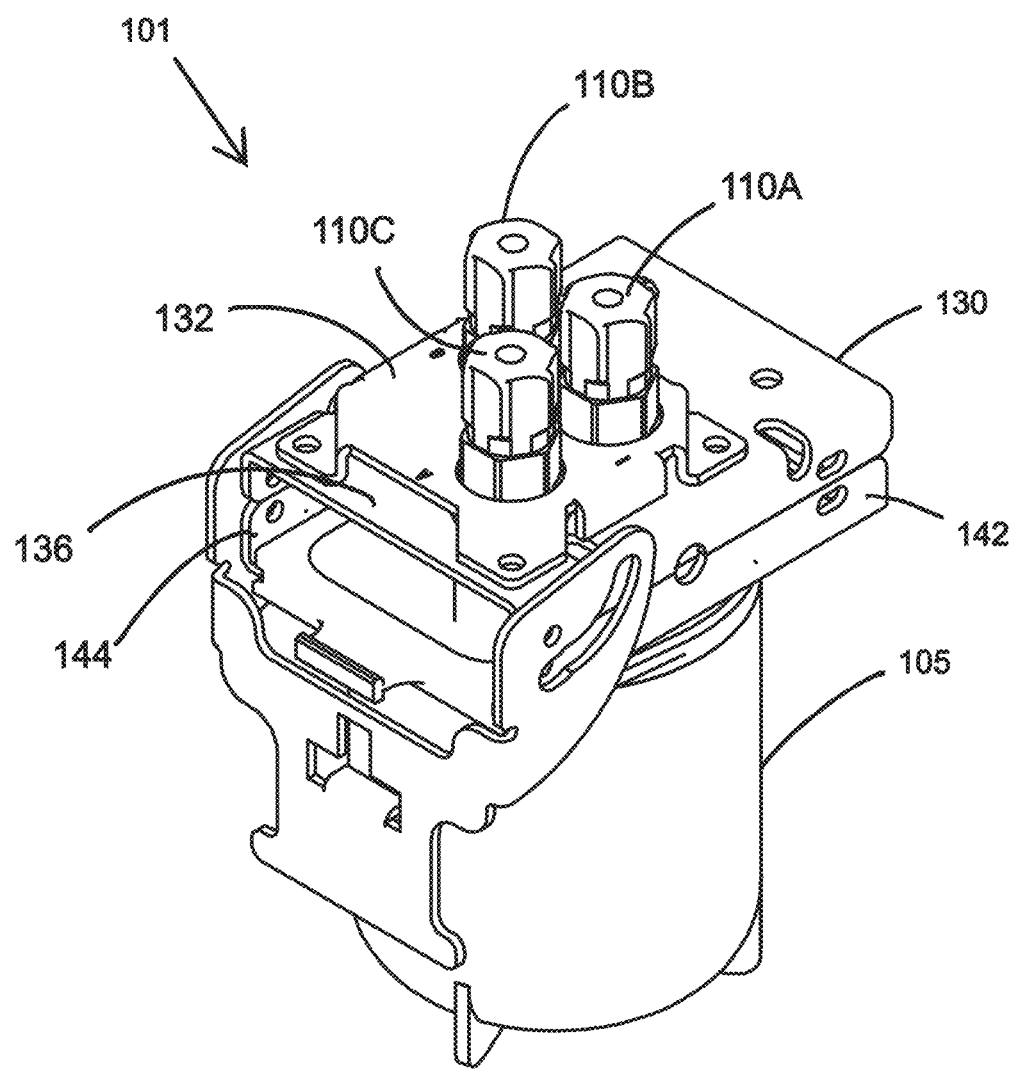
FIG. 8 is a perspective view of another embodiment of a connection assembly with an attached filter.

FIG. 8 is a perspective view of another embodiment of a connection assembly 101. A filter 105, similar to the filter 5 in FIG. 1, is attached to the connection assembly 101. The connection assembly 101 has a similar configuration to the connection assembly 1 as discussed above, except for the configuration of an upper plate 132 and a lower plate 136 of a manifold 130. For example, the connection assembly 101 includes the connector pipes 110A, 110B, 110C that fluidly connect in a sealed manner to ports (not shown) of the attached filter 5, and the manifold 130 includes supports 142, 144.

As shown in FIG. 8, the upper plate 132 can be attached to the lower plate 136. The supports 142, 144 are attached to the lower plate 136. The connector pipes 110A, 110B, 110C have a similar configuration as the connector pipes 10A, 10B, 10C in FIG. 2, except for their upper ends (e.g., the non-insertion ends) include a coupling mechanism. For example, the connector pipes 110A, 110B, 110C each include a flange (not shown) that is disposed between the upper plate 132 and the lower plate 136 as similarly discussed above for the connector pipes 10A, 10B, 10C in FIGS. 4-6.

Figure 9:
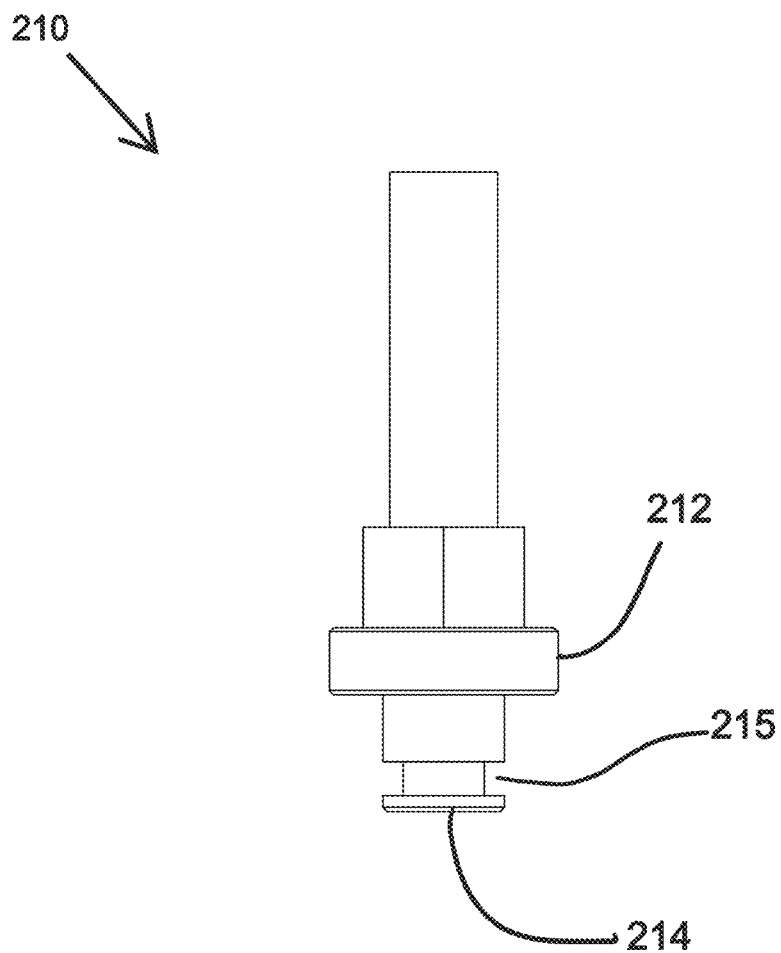
FIG. 9 is a front view of another embodiment of a connector pipe for a connection assembly.

FIG. 9 is a front view of another embodiment of a connector pipe 210 of a connection assembly. In an embodiment, one or more of the connector pipes 10A, 10B, 10C in the connection assembly 1 may have a configuration similar to the connector pipe 210. The connector pipe 210 includes a flange 212 and an insertion end 214. The flange 212 can have a similar configuration as discussed above for the flange 12A of the first connector pipe 10A.

As shown in FIG. 9, the insertion end 214 of the connector pipe 210 includes a trench 215. The trench 215 can retain the O-ring (e.g., O-ring 80A, O-ring 80B, etc.) that forms a seal between the connector pipe 210 and the port (e.g., port 7A, port 7B) of the attached removable cartridge (e.g., filter 5, flushing container 6, etc.). When the removable cartridge is unattached/removed from the connection assembly, the O-ring remains on the connector pipe 210. Accordingly, the O-ring is not removed with the removable cartridge. The O-ring is retained in the trench 215 and is inserted along with the insertion end 214 of the connector pipe 210 into the port of the removable cartridge. The O-ring being disposed in the port of the attached removable cartridge.

In another embodiment, removable cartridge may be configured to retain the O-rings for the connector pipes (e.g., the filter 5 retains the O-rings 80A, 80B, the flushing container 6 retains the O-rings). For example, the O-ring 80A in FIG. 5 may be fitted into a trench in the inner wall 8A of the port 7A of the filter 5 in an embodiment. The O-ring 80A then being retained in filter 5 when it is unattached/removed from the manifold 30.

Aspects:

Any of aspects 1-9 can be combined with any of aspects 10-16.

Aspect 1. A connection assembly, comprising: a manifold including an upper plate and a lower plate; and a connector pipe extending through the lower plate and the upper plate, the connector pipe including a flange disposed between the upper plate and the lower plate, wherein the manifold is configured to attach a removable cartridge such that the connector pipe is inserted into a port of the removable cartridge and an O-ring is compressed between the connector pipe and an inner wall of the port, and the flange has a width configured to prevent tilting of the connector pipe at greater than a maximum tilt angle, the maximum tilt angle based on at least one of a compression ratio upper limit and a compression ratio lower limit of the O-ring.

Aspect 2. The connection assembly of aspect 1, wherein the removable cartridge is a filter.

Aspect 3. The connection assembly of any one of aspects 1 and 2, wherein the connector pipe when angled at the maximum tilt at least one of a) compresses the O-ring at the compression ratio upper limit and b) compresses the O-ring at the compression ratio lower limit.

Aspect 4. The connection assembly of any one of aspects 1-3, wherein a gap is provided between the flange of the connector pipe and at least one of the lower plate and the upper plate of the manifold.

Aspect 5. The connection assembly of any one of aspects 1-4, wherein the flange is configured to satisfy the following relationship:

$$\frac{L \cdot h}{(C_U - C) \cdot T_O} \leq W \geq \frac{L \cdot h}{(C - C_L) \cdot T_O}$$

W being the width of the flange of the connector pipe, C being a compression ratio of the O-ring, $C_L$ being the compression ratio lower limit of the O-ring, $C_U$ being the compression ratio upper limit of the O-ring, $T_O$ being a thickness of the O-ring without compression, L being a length between the flange and the O-ring, and h being a height of a gap provided between the flange and at least one of the upper plate and the lower plate of the manifold.

Aspect 6. The connection assembly of aspect 5, wherein the compression ratio of the O-ring is the compression ratio of the O-ring when connector pipe is inserted into the port and is aligned with the port.

Aspect 7. The connection assembly of any one of aspects 5 and 6, the compression ratio upper limit and the compression ratio lower limit of the O-ring are determined according to International Standard ISO-3601-2.

Aspect 8. The connection assembly of any one of aspects 5-7, wherein the connector pipe is configured to be inserted and fluidly attached to the port with the single O-ring.

Aspect 9. The connection assembly of any one of aspects 1-8, further comprising: a second connector pipe extending through the lower plate and the upper plate, the second connector pipe including a flange disposed between the upper plate and the lower plate, wherein the manifold is configured to attach the removable cartridge such that the second connector pipe is inserted into a second port of the removable cartridge and a second O-ring is compressed between the second connector pipe and an inner wall of the second port, and the flange of the second connector pipe has a width configured to prevent tilting of the second connector pipe at greater than a maximum tilt angle, the maximum tilt angle based on at least one of a compression ratio upper limit and a compression ratio lower limit of the second O-ring.

Aspect 10. A filter assembly, comprising: a manifold including an upper plate and a lower plate; a filter removably attached to the manifold and including a port with an inner wall; a connector pipe extending through the lower plate and the upper plate of the manifold and inserted into the port of the filter, the connector pipe including a flange disposed between the upper plate and the lower plate; and an O-ring compressed between the connector pipe and the inner wall of the port, wherein the flange has a width configured to prevent tilting of the connector pipe at greater than a maximum tilt angle, the maximum tilt angle based on at least one of a compression ratio upper limit and a compression ratio lower limit of the O-ring.

Aspect 11. A filter assembly of aspect 10, wherein the connector pipe when angled at the maximum tilt at least one of a) compresses the O-ring at the compression ratio upper limit and b) compresses the O-ring at the compression ratio lower limit.

Aspect 12. The filter assembly of any one of aspects 10 and 11, wherein a gap is provided between the flange of the connector pipe and at least one of the lower plate and the upper plate of the manifold.

Aspect 13. The filter assembly of any one of aspects 10-12, wherein the flange satisfies the following relationship:

$$\frac{L \cdot h}{(C_U - C) \cdot T_O} \leq W \geq \frac{L \cdot h}{(C - C_L) \cdot T_O}$$

W being the width of the flange of the connector pipe, C being a compression ratio of the O-ring, $C_L$ being the compression ratio lower limit of the O-ring, $C_U$ being the compression ratio upper limit of the O-ring, $T_O$ being a thickness of the O-ring without compression, L being a length between the flange and the O-ring, and h being a height of a gap provided between the flange and at least one of the upper plate and the lower plate of the manifold.

Aspect 14. The filter assembly of any aspect 13, wherein the compression ratio of the O-ring is the compression ratio of the O-ring when the connector pipe is inserted into the port and is aligned with the port.

Aspect 15. The filter assembly of any one of aspects 13 and 14, the compression ratio upper limit and the compression ratio lower limit of the O-ring are determined according to International Standard ISO-3601-2.

Aspect 16. The filter assembly of any one of aspects 10-15, wherein the connector pipe is fluidly connected to the port with the single O-ring.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

What is claimed is:

1. A connection assembly, comprising:
a manifold including an upper plate and a lower plate; and
a connector pipe extending through the lower plate and the upper plate, the connector pipe including a flange disposed between the upper plate and the lower plate, wherein
the manifold is configured to attach a removable cartridge such that the connector pipe is inserted into a port of the removable cartridge and an O-ring is compressed between the connector pipe and an inner wall of the port, and
the flange has a width configured to prevent tilting of the connector pipe at greater than a maximum tilt angle, the maximum tilt angle based on at least one of a compression ratio upper limit and a compression ratio lower limit of the O-ring,
wherein the flange is configured to satisfy the following relationship:

$$\frac{L \cdot h}{(C_U - C) \cdot T_O} \leq W \geq \frac{L \cdot h}{(C - C_L) \cdot T_O}$$

W being the width of the flange of the connector pipe,

C being a compression ratio of the O-ring, $C_L$ being the compression ratio lower limit of the O-ring, $C_U$ being the compression ratio upper limit of the O-ring, $T_O$ being a thickness of the O-ring without compression, L being a length between the flange and the O-ring, and h being a height of a gap provided between the flange and at least one of the upper plate and the lower plate of the manifold.

2. The connection assembly of claim 1, wherein the removable cartridge is a filter.

3. The connection assembly of claim 1, wherein the connector pipe when angled at the maximum tilt at least one of a) compresses the O-ring at the compression ratio upper limit and b) compresses the O-ring at the compression ratio lower limit.

4. The connection assembly of claim 1, wherein a gap is provided between the flange of the connector pipe and at least one of the lower plate and the upper plate of the manifold.

5. The connection assembly of claim 1, wherein the compression ratio of the O-ring is the compression ratio of the O-ring when the connector pipe is inserted into the port and is aligned with the port.

6. The connection assembly of claim 1, the compression ratio upper limit and the compression ratio lower limit of the O-ring are predetermined values based on the O-ring.

7. The connection assembly of claim 1, wherein the connector pipe is configured to be inserted and fluidly attached to the port with the O-ring.

8. The connection assembly of claim 1, further comprising:

a second connector pipe extending through the lower plate and the upper plate, the second connector pipe including a flange disposed between the upper plate and the lower plate, wherein the manifold is configured to attach the removable cartridge such that the second connector pipe is inserted into a second port of the removable cartridge and a second O-ring is compressed between the second connector pipe and an inner wall of the second port, and the flange of the second connector pipe has a width configured to prevent tilting of the second connector pipe at greater than a maximum tilt angle, the maximum tilt angle based on at least one of a compression ratio upper limit and a compression ratio lower limit of the second O-ring.

9. A filter assembly, comprising:

a manifold including an upper plate and a lower plate;

a filter removably attached to the manifold and including a port with an inner wall;

a connector pipe extending through the lower plate and the upper plate of the manifold and inserted into the port of the filter, the connector pipe including a flange disposed between the upper plate and the lower plate; and an O-ring compressed between the connector pipe and the inner wall of the port, wherein the flange has a width configured to prevent tilting of the connector pipe at greater than a maximum tilt angle, the maximum tilt angle based on at least one of a compression ratio upper limit and a compression ratio lower limit of the O-ring, wherein the flange satisfies the following relationship:

$$\frac{L \cdot h}{(C_U - C) \cdot T_O} \leq W \geq \frac{L \cdot h}{(C - C_L) \cdot T_O}$$

W being the width of the flange of the connector pipe,

C being a compression ratio of the O-ring, $C_L$ being the compression ratio lower limit of the O-ring, $C_U$ being the compression ratio upper limit of the O-ring, $T_O$ being a thickness of the O-ring without compression, L being a length between the flange and the O-ring, and h being a height of a gap provided between the flange and at least one of the upper plate and the lower plate of the manifold.

10. The filter assembly of claim 9, wherein the connector pipe when angled at the maximum tilt at least one of a) compresses the O-ring at the compression ratio upper limit and b) compresses the O-ring at the compression ratio lower limit.

11. The filter assembly of claim 9, wherein a gap is provided between the flange of the connector pipe and at least one of the lower plate and the upper plate of the manifold.

12. The filter assembly of claim 9, wherein the compression ratio of the O-ring is the compression ratio of the O-ring when the connector pipe is inserted into the port and is aligned with the port.

13. The filter assembly of claim 9, the compression ratio upper limit and the compression ratio lower limit of the O-ring are predetermined values based on the O-ring.

14. The filter assembly of claim 9, wherein the connector pipe is fluidly connected to the port with the O-ring.

* * * * *